US012187239B2

(12) United States Patent
Duesterwald et al.

(10) Patent No.: US 12,187,239 B2
(45) Date of Patent: Jan. 7, 2025

(54) SYSTEMS AND METHODS FOR CLEARING SNOW FROM AN ELECTRIC VEHICLE

(71) Applicant: GM GLOBAL TECHNOLOGY OPERATIONS LLC, Detroit, MI (US)

(72) Inventors: Connor Duesterwald, Nanaimo (GB);
Desigan Padayachee, North York (CA);
Anna Siniavina, Richmond Hill (CA);
Stacey M. Marmara, Markham (CA);
Michael D. Alarcon, Markham (CA);
Patrick Giancarlo Gabriel DiGioacchino, Niagara Falls (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 203 days.

(21) Appl. No.: 18/065,873

(22) Filed: Dec. 14, 2022

(65) Prior Publication Data

US 2024/0198968 A1 Jun. 20, 2024

(51) Int. Cl.
| | |
|---|---|
| *B60S 1/08* | (2006.01) |
| *B60L 58/13* | (2019.01) |
| *B60S 1/02* | (2006.01) |
| *G01W 1/14* | (2006.01) |

(52) U.S. Cl.
CPC ............ *B60S 1/0866* (2013.01); *B60L 58/13* (2019.02); *B60S 1/026* (2013.01); *B60S 1/0833* (2013.01); *G01W 1/14* (2013.01); *B60L 2250/12* (2013.01); *B60L 2250/16* (2013.01)

(58) Field of Classification Search
CPC .... B60S 1/0818; B60S 1/0822; B60S 1/0866; B60S 1/0833; B60S 1/023; B60S 1/026; B60S 1/485; B60S 1/66; B60L 58/13; B60L 2250/12; B60L 2250/16; G01W 1/14; B60H 1/00735; B60H 1/00785; B60H 1/00821; B60H 1/00964; H05B 3/84; H05B 3/86; B61D 25/00
USPC ........................................................ 701/36
See application file for complete search history.

(56) References Cited

U.S. PATENT DOCUMENTS 7,345,445 B2 3/2008 Huntzicker
10,560,983 B2 * 2/2020 Seubert ................. G01S 7/4813

FOREIGN PATENT DOCUMENTS

DE 102020102352 B4 * 12/2021

\* cited by examiner

*Primary Examiner* — Andrew Joseph Rudy
(74) *Attorney, Agent, or Firm* — Lorenz & Kopf LLP

(57) ABSTRACT

Systems and methods associated with an electric vehicle are provided. The electric vehicle includes a sensor system, a communications system and a snow clearing system. The systems and methods detect, based on data from the sensor system, snow that may accumulate on a window of the electric vehicle. When snow is detected, a notification is provided, via the communications system, to a remote user device. The notification requests user acceptance of use of charge of a battery of the electric vehicle to operate the snow clearing system of the electric vehicle. The systems and methods receive, by the communications system, a response to the notification from the user device, and when the response indicates acceptance of the use of charge of the battery, the snow clearing system is activated. The snow clearing system is powered by the battery.

20 Claims, 3 Drawing Sheets

SYSTEMS AND METHODS FOR CLEARING SNOW FROM AN ELECTRIC VEHICLE

INTRODUCTION

The technical field generally relates to vehicles, systems and methods having automated snow clearing functionality, and more particularly relates to battery powered snow clearing systems associated with an electric vehicle.

Many vehicle users who park their vehicles outside in cold environments often face the problem of clearing off their vehicle from snow and ice. Manual removal of snow and ice can be frustrating and time consuming. Automated snow clearing features help users who want the convenience, and reduced effort, of not having to clear snow off their vehicle. Devices aiding in the removal of snow and ice (otherwise referred to as snow clearing systems herein) may take the form of, for example, heating elements that are embedded in a vehicle window or mirror or window wipers. Window wipers employ at least one wiping member typically having a blade which contacts a vehicle window. A motor drives the wiping member across a portion of the window's surface to physically remove any accumulated snow or rain thereby helping to maintain driver visibility. Such systems also help minimize the formation of ice by sweeping away snow before it melts.

Whilst modern electric vehicles have a large storage of battery charge, automated operation of the snow clearing system, when the vehicle is parked and not plugged-in, will drain the battery charge to some extent. A user may not always wish to trade the loss of battery charge (or driving range) for the convenience of having snow automatically cleared from the vehicle.

Accordingly, it is desirable to provide systems and methods associated with an electric vehicle that minimize accumulation of ice and snow on one or more windows of an electric vehicle whilst also factoring-in user requirements and state of charge of the battery. Furthermore, other desirable features and characteristics of the present invention will become apparent from the subsequent detailed description and the appended claims, taken in conjunction with the accompanying drawings and the foregoing technical field and background.

SUMMARY

In one aspect, a method for controlling an electric vehicle is provided. The method includes: detecting, based on data from a sensor system of the electric vehicle, snow that may accumulate on a window of the electric vehicle; when snow is detected, providing a notification, via a communications system of the electric vehicle, to a remote user device, wherein the notification requests user acceptance of use of charge of a battery of the electric vehicle to operate a snow clearing system of the electric vehicle; receiving, by the communications system, a response to the notification from the user device; when the response indicates acceptance of the use of charge of the battery, activating the snow clearing system, wherein the snow clearing system is powered by the battery.

In embodiments, detecting, based on data from the sensor system, snow that may accumulate on the window includes detecting based on a fusion of data from two or more of: a weather report received in response to sending a location of the electric vehicle by the communications system, the weather report providing precipitation data for the location of the electric vehicle; data from a precipitation sensor of the electric vehicle; perception data from a perception system of the electric vehicle; and outside temperature from a temperature sensor of the electric vehicle.

In embodiments, the snow clearing system includes one or more of: an outside rear view mirror heater; a window heater; and a wiper.

In embodiments, the notification includes a plurality of types of operation of the snow clearing system that each consume a different amount of power and an indication of a limit amount of battery charge consumption for each of the plurality of types, wherein the response includes a selection of one of the plurality of types and the method comprises operating the snow clearing system according to the selected one of the plurality of types.

In embodiments, the method includes operating the snow clearing system until the limit amount of battery charge consumption has been reached.

In embodiments, the method includes detecting, by the sensor system, a snow clearance state as a result of a first operation of the snow clearing system; and adapting operation of subsequent operations of the snow clearing system to change an amount of power consumed depending on the snow clearance state such that the power consumption of the snow clearing system increases as snow accumulates on the window of the electric vehicle at a faster rate.

In embodiments, detecting the snow clearance state includes detecting an obstruction of the window by a perception system of the sensor system.

In embodiments, operating the snow clearing system and detecting the snow clearance state is performed in a loop, wherein adapting operation of subsequent operation of the snow clearing system comprises adjusting a time between successive iterations of the loop.

In embodiments, the method including detecting opening of a door of the electric vehicle using a door sensor and ceasing operation of the snow clearing system in response to detecting opening of the door.

In another aspect, a system associated with an electric vehicle is provided. The system includes: a sensor system; a communications system; and a snow clearing system. A processor is in operable communication with the sensor system, the communications system and the snow clearing system. The processor is configured to execute program instructions cause the processor to: detect, based on data from the sensor system, snow that may accumulate on a window of the electric vehicle; when snow is detected, provide a notification, via the communications system, to a remote user device, wherein the notification requests user acceptance of use of charge of a battery of the electric vehicle to operate the snow clearing system of the electric vehicle; receive, by the communications system, a response to the notification from the user device; and when the response indicates acceptance of the use of charge of the battery, activate the snow clearing system, wherein the snow clearing system is powered by the battery.

In embodiments, to detect, based on data from the sensor system, snow that may accumulate on the window includes detecting based on a fusion of data from two or more of: a weather report received in response to sending a location of the electric vehicle by the communications system, the weather report providing precipitation data for the location of the electric vehicle; data from a precipitation sensor of the electric vehicle; perception data from a perception system of the electric vehicle; and outside temperature from a temperature sensor of the electric vehicle.

In embodiments, the snow clearing system comprises one or more of: an outside rear view mirror heater; a window heater; and a wiper.

In embodiments, the notification includes a plurality of types of operation of the snow clearing system that each consume a different amount of power and an indication of a limit amount of battery charge consumption for each of the plurality of types, wherein the response includes a selection of one of the plurality of types and the program instructions are configured to cause the at least one processor to operate the snow clearing system according to the selected one of the plurality of types.

In embodiments, the program instructions are configured to cause the processor to operate the snow clearing system until the limit amount of battery charge consumption has been reached.

In embodiments, the program instructions are configured to cause the processor to detect, by the sensor system, a snow clearance state as a result of a first operation of the snow clearing system; and adapt operation of subsequent operations of the snow clearing system to change an amount of power consumed depending on the snow clearance state such that the power consumption of the snow clearing system increases as snow accumulates on the window of the electric vehicle at a faster rate.

In embodiments, detecting the snow clearance state includes detecting an obstruction of the window by a perception system of the sensor system.

In embodiments, operating the snow clearing system and detecting the snow clearance state is performed in a loop, wherein adapting operation of subsequent operation of the snow clearing system comprises adjusting a time between successive iterations of the loop.

In embodiments, detecting opening of a door of the electric vehicle using a door sensor and ceasing operation of the snow clearing system in response to detecting opening of the door.

In a further aspect, an electric vehicle is provided. The electric vehicle includes: a sensor system; a communications system; a snow clearing system; and a processor in operable communication with the sensor system, the communications system and the snow clearing system. The processor is configured to execute program instructions. The program instructions are configured to cause the processor to: detect, based on data from the sensor system, snow that may accumulate on a window of the electric vehicle; when snow is detected, provide a notification, via the communications system, to a remote user device, wherein the notification requests user acceptance of use of charge of a battery of the electric vehicle to operate the snow clearing system of the electric vehicle; receive, by the communications system, a response to the notification from the user device; and when the response indicates acceptance of the use of charge of the battery, activate the snow clearing system, wherein the snow clearing system is powered by the battery.

In embodiments, the program instructions are configured to cause the processor to detect, by the sensor system, a snow clearance state as a result of a first operation of the snow clearing system; and adapt operation of subsequent operations of the snow clearing system to change an amount of power consumed depending on the snow clearance state such that the power consumption of the snow clearing system increases as snow accumulates on the window of the electric vehicle at a faster rate.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
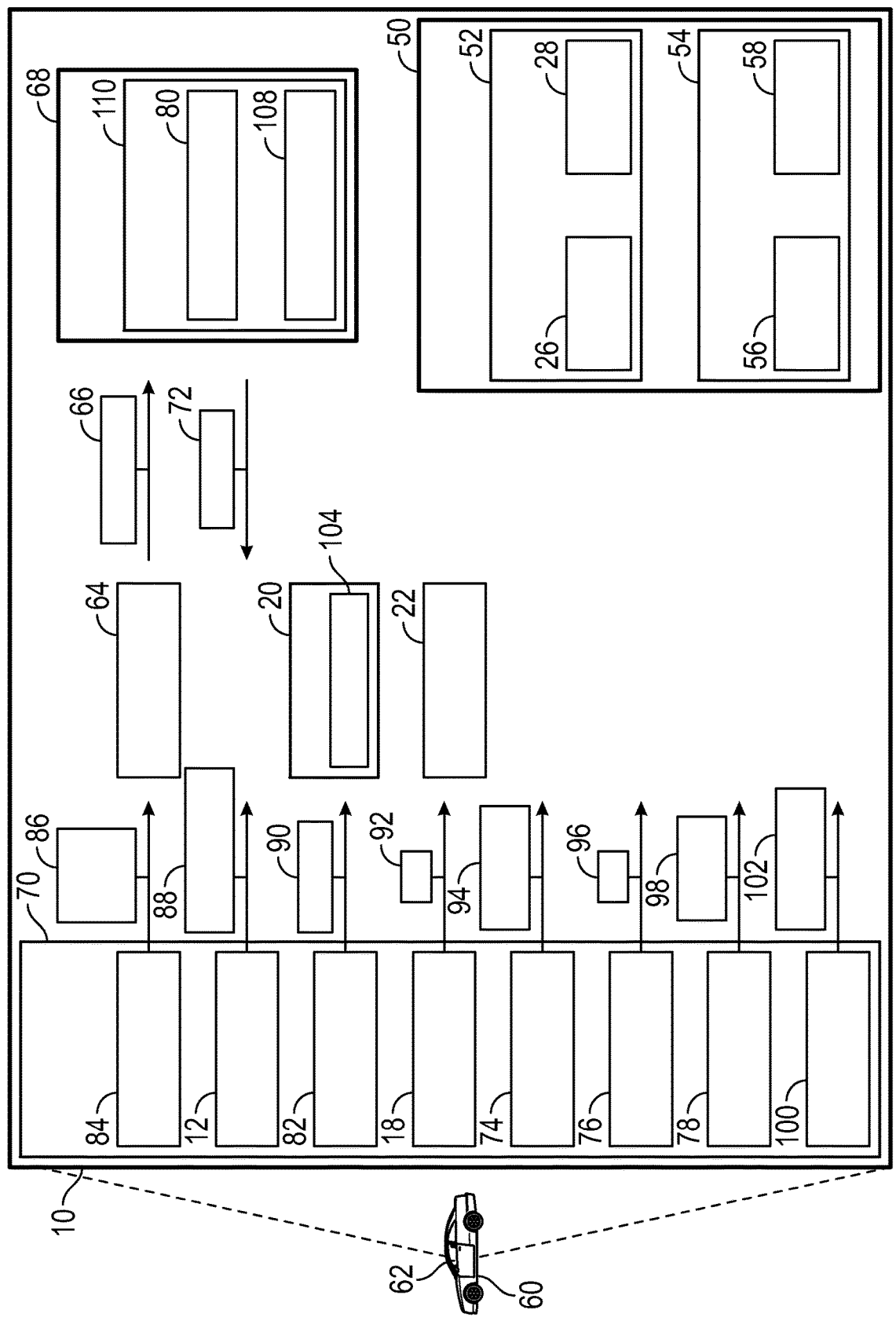
FIG. 1 is a block diagram of a vehicle system having a snow clearing system in accordance with an embodiment.

FIG. 1 is a block diagram of a vehicle system 10 in accordance with embodiments of the present disclosure. The vehicle system 10 is associated with a vehicle 60. The vehicle 60 generally includes a chassis, a body, front wheels, and rear wheels. The body is arranged on the chassis and substantially encloses components of the vehicle 60. The body and the chassis may jointly form a frame. The wheels are each rotationally coupled to the chassis near a respective corner of the body. The body includes front, side and rear windows 62 that are susceptible to accumulating snow and ice in cold weather environments. A front windshield of the windows 62 and a rear windshield of the windows 62 are often more slanted than side windows and thus may have a greater need for snow clearing. The vehicle 60 may, or may not, be an autonomous vehicle that is automatically controlled to carry passengers from one location to another. The vehicle 60 may be a passenger car, truck, sport utility vehicle (SUVs), recreational vehicle (RVs), shared passenger vehicle, coach, etc. The vehicle 60 generally includes a propulsion system and a transmission system. The propulsion system includes an electric machine such as a traction motor. The transmission system is configured to transmit power from the propulsion system to the vehicle wheels. The power for the propulsion system is provided by a battery 64 (or a plurality of batteries).

The vehicle system 10 includes a processor 22 for controlling a snow clearing system 50. The snow clearing system 50 includes at least a wiper system 52 and a heating system 54. The wiper system 52 includes a wiper motor 26 and a wiper 28. The wiper 28 is provided to wipe a front windshield or a rear windshield. A plurality of wipers may be provided for each windshield or for respective windshields. The heating system 54 includes at least one of an Out Side Rear View Mirror (OSVRM) heater 56 and a window heater 58. The window heater 58 can be a front windshield heater, a rear windshield heater, side window heaters or any combination thereof. The window heater 58 can include resistive wires or strips that are embedded in, or otherwise connected to, the window or mirror to generate heat and defrost snow and ice on the window or mirror. The snow clearing system 50 is powered by the battery 64 and thus will, to some extent, reduce the state of charge of the battery 64, which will affect a time to charge the battery 64 or a range of the vehicle 60 that is powered by the battery 64.

In embodiments, the processor 22 controls various outputs including the snow clearing system 50, specifically the wiper motor 26 and the OSRVM heater 56 and the window heater 58. The outputs additionally include notifications 66 to a user device 68. The processor 22 receives data and signals from a plurality of inputs each coupled to outputs of various data sources. The data sources include a sensor and connectivity system 70 and responses 72 from the user device 68. The processor 22 is additionally in communication with memory 20. The sensor and connectivity system 70 includes at least a precipitation sensor 12 (or moisture sensor), an ambient temperature sensor 18, a door position sensor 84, a Global Positioning System (GPS) 82, a charging sensor 74, a State Of Charge (SOC) sensor 76, a communications system 78 and a perception system 100. The various inputs allow the processor 22 to determine whether snow is accumulating on one or more windows 62 of the vehicle 60 in order to activate the snow clearing system 50. Further, the various inputs inform the processor as to a rate of snowfall and thus a rate at which the snow clearing system 50 should be operated after activation. The various inputs to the processor 22 further include a remote user response as to whether the snow clearing system 50 should be operated and at which charge consumption limit. The various inputs to the processor 22 also allow the processor to determine when to stop operation of the snow clearing system 50, e.g. due to ineffectiveness, due to the door being opened or due to detection of snow ceasing to accumulate.

The precipitation sensor 12 detects the presence of moisture (e.g. water/ice/snow) on the exterior of a vehicle window and outputs data representing sensed precipitation 88. The door position sensor 84 detects whether a door is in an open or closed state and outputs data representing the open/closed state 86. The GPS 82 detects a global position of the vehicle 60 and outputs data representing the location 90 including global coordinates for the vehicle 60. The ambient temperature sensor 18 monitors the Outside Air Temperature (OAT 92) and outputs data representing the same. The charging sensor 74 detects whether the battery 64 is currently charging or not, e.g. whether the vehicle 60 is plugged-in to a charging socket. The charging sensor 74 outputs the charging status 94. The SOC sensor 76 monitors a state of charge of the battery 64 and outputs data representing the SOC 96. The communications system 78 is configured to wirelessly communicate information to and from other entities, such as but not limited to, other vehicles ("V2V" communication) infrastructure ("V2I" communication), remote systems, and/or personal devices. In an exemplary embodiment, the communications system 78 is a wireless communication system configured to communicate via a wireless local area network (WLAN) or by using cellular data communication. The communications system 78 is in communication with a remote weather reporting system and outputs a corresponding weather report 98 including information on forecast snowfall and time of the forecast snowfall. The user input device 80 includes a user input device that is part of the user device 68 and provides a response 72 from a user to the processor over a network that is received by the communications system 78. As is more fully explained below, the processor 22 utilizes data provided by the various components of the sensor and connectivity system 70 and user selections from the user device 68 to determine when to activate the snow clearing system 50, at what charge usage level to operate the snow clearing system 50 and when to cease operation of the snow clearing system 50.

In embodiments, the perception system 100 includes one or more perception devices that sense observable conditions of the exterior environment and optionally also the interior environment of the vehicle 60. The perception devices can include, but are not limited to, radars, lidars, optical cameras, thermal cameras, ultrasonic sensors, etc. The optical cameras are mounted on the vehicle 60 and are arranged for capturing images (e.g. a sequence of images in the form of a video) of an environment surrounding the vehicle 60. In one embodiment, the perception system 100 includes a Front Camera Module (FCM) and optionally also a Rear Camera Module (RCM) that are able to perceive whether a front or rear window is obstructed by snow or ice. The perception system 100 may include any other camera or other perception device to capture perception data allowing snow or ice obstruction of a window to be determined. The perception system 100 processes raw image data from the perception devices to locate and classify features in the environment of the vehicle 60. In particular, as it pertains to the present disclosure, the perception system 100 should provide perception data 102 describing the presence of falling snow and the presence of snow accumulating on a window of the vehicle 60.

Sensors capable of detecting moisture present on a window's surface (e.g. precipitation sensor 12) are known. One known type of moisture sensor employs a plurality of adjacent pairs of conductive strips coupled to a current detector and embedded on a window's surface. A processor 22 monitors the current detector to determine the number of pairs of conductive strips contacted by moisture droplets and calculates therefrom the relative wetness of the window's surface. Another known moisture sensor, commonly referred to as optoelectronic rain sensor, employs optical sensors to determine light conditions from which the degree of surface wetness may be calculated. Such an optical sensor may also allow snow accumulation on the window to be detected. It should be appreciated that precipitation sensor 12 may take either of these forms or any other form suitable for detecting the presence of moisture on a window's outer surface.

The user device 68 can be a laptop, tablet, smartphone or any other portable computer device. The user device 68 is able to receive data representing a notification 66 from the vehicle 60 (e.g. via the processor 22 and the communications system 78 of the vehicle 60) requesting a user to accept use of charge of the battery 64 and also to select or input a limit on the battery usage by the snow clearing system 50. The notification is provided on a user interface 108 that is presented on a display 110. The user interface 108 may be a graphical user interface. The user input device 80 may be a touchscreen of the display 110 or any other user input device 80 including a keyboard (not separately shown), a microphone associated with a speech recognition system (not separately shown), switches or levers, one or more buttons, a mouse, a touchpad or other suitable device to receive data and/or commands from the user. Multiple input devices can also be utilized. The display of the notification and the processing of the response from the user can be controlled through a vehicle application (app) running on a processor of the user device 68.

The processor 22 (or processors) can be any custom made or commercially available processor, a central processing unit (CPU), a graphics processing unit (GPU), an auxiliary processor among several processors, a semiconductor based microprocessor (in the form of a microchip or chip set), a macroprocessor, any combination thereof, or generally any device for executing instructions. The memory 20 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The memory 20 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 22 in controlling the vehicle 60.

The instructions may include one or more separate programs 104, each of which comprises an ordered listing of computer program instructions that are executable instructions for implementing logical functions. The instructions, when executed by the processor 22, receive and process signals from the sensor and connectivity system 70, perform logic, calculations, methods and/or algorithms for automatically controlling the components of the vehicle 60, and generate control signals to automatically control the components of the vehicle 60 including the snow clearing system 50 based on the logic, calculations, methods, and/or algorithms.

In various embodiments, when the instructions of the program 104 are executed by the processor 22, the methods and systems described herein are implemented. The processor 22 is thus configured to detect, based on data from the sensor and connectivity system 70, snow that may accumulate on a window of the vehicle 60 and to responsively provide a notification 66, via the communications system 78 of the vehicle 60, to the user device 68. The notification 66 requests user acceptance of use of charge of the battery 64 of the vehicle 60 to operate the snow clearing system 50 of the vehicle 60. The notification 66 may also allow the user to select one of a plurality of levels of usage of the battery 64 that are associated with different types of operation of the snow clearing system 50 that each consume a different amount of power. The user can select one of the plurality of types through the user input device 80 of the user device 68 and the snow clearing system 50 is operated accordingly. The processor 22 is configured to monitor effectiveness of the snow clearing system 50 and adapt operation thereof accordingly by reducing or increasing intensity of operation depending upon rate of snow accumulation on the window or mirror according to information from the sensor and connectivity system 70. Further, the processor 22 is configured to continue operating the snow clearing system until a user selected limit of usage of the charge of the battery 64 has been reached or until snow has been effectively cleared and no further snow is accumulating or until some other exit condition is reached (such as opening of a door of the vehicle 60).

Memory 20 stores thresholds and conditions for use by the processor to run the processing described further herein. For example, a minimum battery threshold is stored in memory 20, which requires a certain minimum SOC in order to proceed with the snow clearing system process described with respect to FIGS. 2A and 2B. Further, a maximum detection interval may be defined that controls a maximum rate of processing of a detection loop described with respect to FIGS. 2A and 2B. A maximum number of ineffective iterations of the snow clearing system 50 may also be stored in memory 20.

Figure 2A:
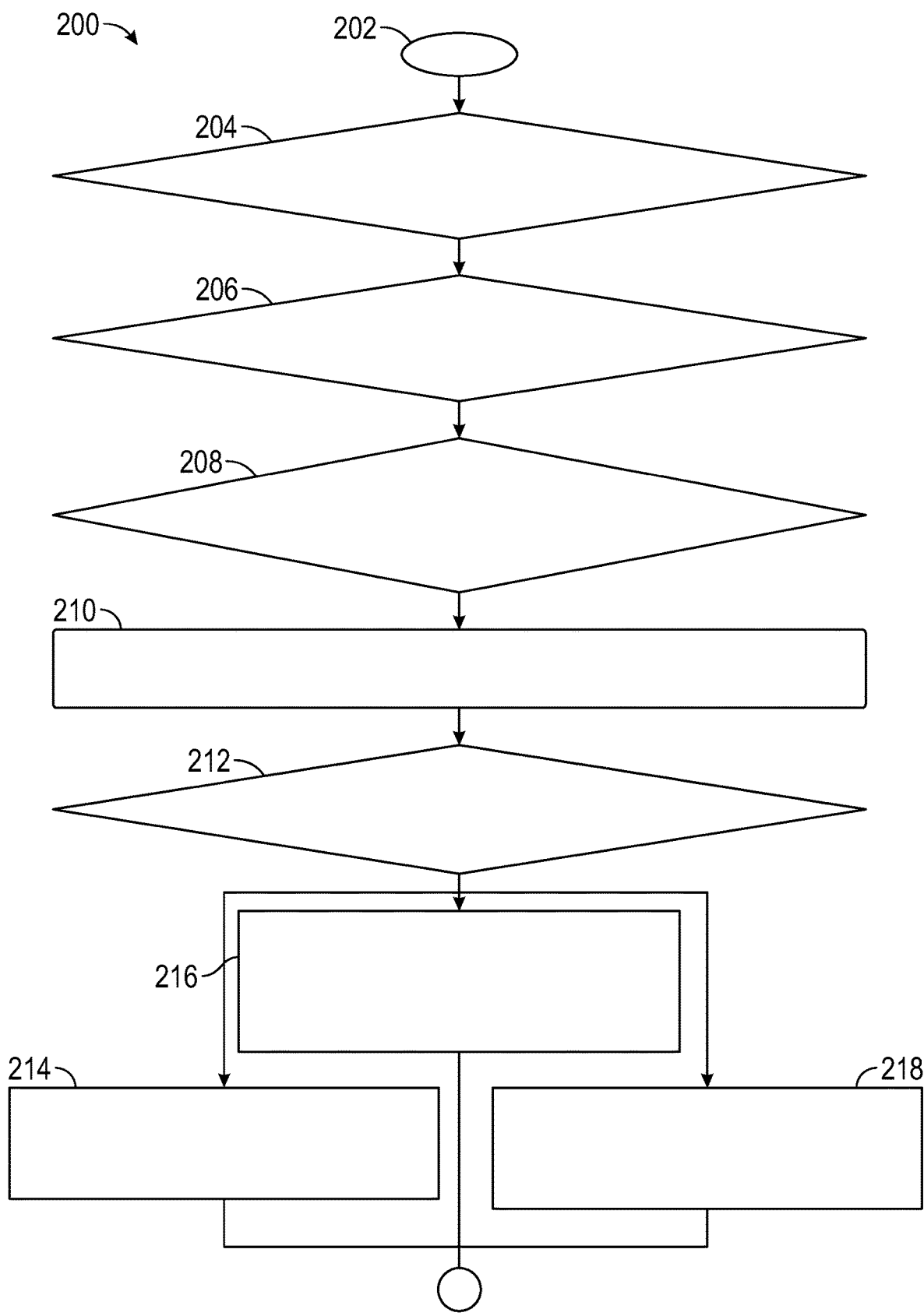
FIGS. 2A and 2B provide flow charts of a process for automated operation of the snow clearing system of the vehicle system shown in FIG. 1 in accordance with an embodiment.
Figure 2B:
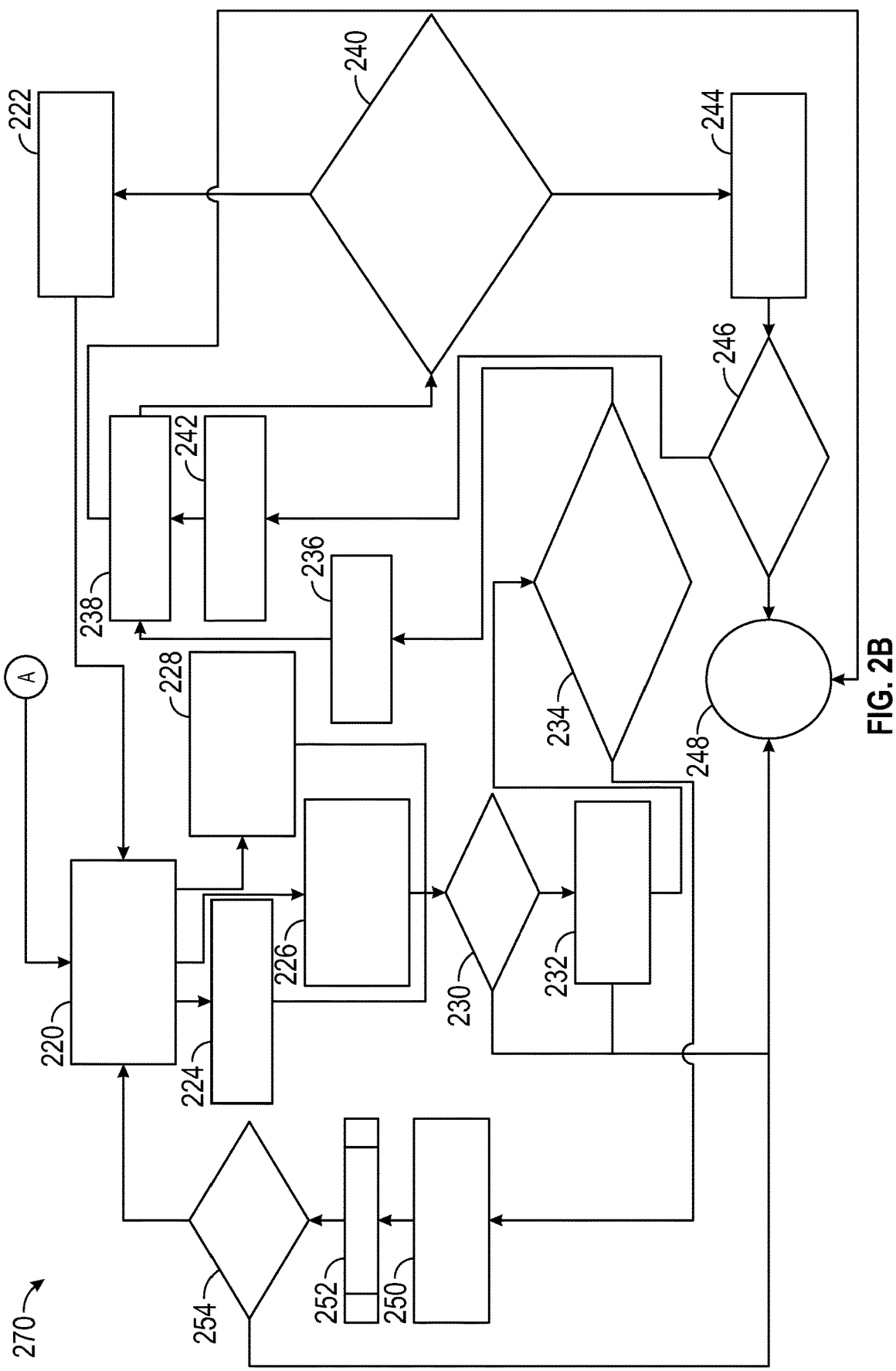

FIGS. 2A and 2B show a flow chart describing an exemplary method 200 of the present disclosure for controlling the snow clearing system 50. The steps of the flow chart of FIGS. 2A and 2B can be implemented by computer program instructions of the program 104 stored on the memory 20 executed by the processor 22. The steps may be carried out by the vehicle system 10 of FIG. 1. The method 200 starts at step 202 at the fulfillment of one or more conditions. The method may start when the vehicle 60 has been determined by the processor 22 to be in a parked state. This can be determined based on the vehicle 60 not moving for a certain minimum amount of time, based on a park gear being engaged or based on the vehicle 60 being turned off (e.g. through a button on a dash panel of the vehicle 60).

At step 204, a pre-assessment to detect snow is performed. In one embodiment, the location 90 from the GPS 82 is sent to a remote weather system via the communications system 78 and over a network (e.g. a cellular network). The remote weather system responds with a weather report 98 for that location that includes a description of snowfall for the location 90. In other embodiments, the weather report 98 may be periodically obtained and include a future time forecast for snowfall with respect to location and the processor 22 can assess the weather report 98 with respect to current parked location and time to detect a probability of snowfall. The pre-assessment of step 204 may be alternatively performed such as by detecting snowfall using the perception system 100, based on detected OAT 92 and/or based on sensed precipitation 88. If snow is detected in step 204, the method 200 proceeds. If not, the method 200 returns to start 202 and may periodically perform step 202.

At step 206, a viability check for the method 200 is performed based on battery usage. In step 206, an assessment is made as to whether the vehicle 60 is plugged in by detecting the charging status 94 through the charging sensor 74. Further, an assessment is made as to whether the SOC 96 detected by the SOC sensor 76 is greater than a minimum battery threshold retrieved from memory 20. If the battery 64 has more than the minimum amount of charge or if the vehicle 60 is plugged in for charging the battery 64, then the method 200 proceeds. If not, the method 200 exits. The minimum battery threshold may be user selected through the user input device 80 or may be hard set in the memory 20 of the vehicle system 10.

At step 208, the method 200 detects snow that may accumulate on the windows 62 of the vehicle 60 based on a fusion of data from the sensor and connectivity system 70. In the exemplary embodiment, this detection is performed through a combination of conditions being met, namely the OAT 92 being less than 0° C., the precipitation sensor 12 sensing detecting snowfall accumulation on a window and the perception system 100 detecting snow. The perception system 100 may classify snow based on obstruction of a perception sensor associated with a window and/or based on analyzing optical images to determine the presence of snow in the air. In an exemplary embodiment, snowfall is detected using snow detection models of a trained classifier that takes, as input, one or more texture-based image features including gray level co-occurrence matrix (GLCM) and local binary pattern (LBP). Only one or two of the conditions of step 208 may be assessed to detect snow in some embodiments such as the perception based detection of snowfall. Further, other conditions may be assessed such as reviewing the weather report 98 for snow at the current time and location. If no snow is detected in step 208, the method 200 returns to the start 202.

When snow is detected in step 208, the method 200 provides the notification 66 to a user requesting acceptance of operation of the snow clearing system 50. The notification 66 is provided to a remote user device 68 over a network and through the communications system 78. The notification 66 informs the user of possible buildup of snow on the vehicle 60 and requests approval to monitor and clear snow from part of the vehicle 60 such as one or more windows 62 (e.g. a front and/or rear windshield) and outside mirrors. The notification 66 is converted into a presentation on the user interface 108 of the user device 68 by an application running on the user device 68. The user may select to proceed with activation of the snow clearing system 50 by selection through the user interface 108, which generates a response 72 that is sent to the processor 22 over the cellular network and via the communications system 78. In some embodiments, the vehicle system 10 may be preset (which may be a user selectable setting) with a default to assume the user accepts operation of the snow clearing system 50 unless a refusal is selected in response to the notification 66 within a certain amount of time. The notification 66 may include an indication of SOC 96 (sent by the processor 22 over the communications system 78) so that the user can make an informed decision. If the user does not accept use of the snow clearing system 50, the method 200 exits and is ceased until the vehicle 60 is parked again.

In step 212, the user selects one of a plurality of automatic snow clearing levels 214, 216, 218. The plurality of automatic snow clearing levels 214, 216, 218 may be included as options in an initial notification 66 provided in step 210 or as a subsequent option after acceptance in step 210. The plurality of automatic snow clearing levels 214, 216, 218 may respectively represent different amounts of power used by the snow clearing system 50 and/or a battery charge usage limit and/or a prediction of battery usage. The different amounts of power used by the snow clearing system 50 can be set by a rate of operation of the snow clearing system 50 or a range of features of the snow clearing system 50 that are operated. The battery usage charge limit may represent a maximum amount of charge of the battery 64 that the user permits to be used by the snow clearing system 50. The battery usage charge limit may be presented as a percentage of battery charge, a reduction in vehicle travelling range, an amount of charging time, or a combination thereof. The prediction of battery usage can be determined by the processor 22 based on a prediction of amount of time of snowfall, a prediction of heaviness of snowfall and usage history of the user. The prediction of amount of time of snowfall and heaviness of snowfall may be based on information derived from the weather report 98, which includes future time forecast of the snow. The usage history of the user of the vehicle 60 may be tracked in memory or in a cloud system to determine likely duration of the parking (e.g. a user may park in approximately the same location for 12 hours overnight). Accordingly, the current time and location of the vehicle 60 may be combined with a user's usage history to predict a duration of the parking. The processor 22 may additionally store a battery usage per hour for different levels of snowfall and different ones of the plurality of automatic snow clearing levels 214, 216, 218 to determine a prediction of total battery usage.

In one example, the plurality of automatic snow clearing levels 214, 216, 218 may include low, medium and high automatic snow clearing levels. The low, medium and high snow clearing levels may be associated with relatively low, medium and high user selectable limits to SOC usage. The limits represent a maximum amount of charge of the battery permitted to be used by the snow clearing system 50. The limits may be presented to the user in terms of battery charge percentage, range reduction or increase in battery recharge time. Non-limiting values for the low, medium and high limits may be 1% of battery charge/5 km in range reduction/5 minutes of recharge time, 3% of battery charge/10 km in range reduction/10 minutes of recharge time, 5% of battery charge/15 km in range reduction/15 minutes of recharge time.

In another example, the plurality of automatic snow clearing levels 214, 216, 218 may be respectively associated with different power levels for operating the snow clearing system. Low, medium and high power levels may have relatively low, medium and high numbers of features of the snow clearing system 50 operating. A lower power level may have at least one of the front and rear windshield wipers being operated. A medium power level may have at least one of the front and rear windshield wiper being operated and the OSRVM heater 56 being operated. A high power level may have at least one of the front and rear windshield wiper being operated, the OSRVM heater 56 being operated and at least one of the front and rear windshield heater 58 being operated.

FIG. 2B is a continuation of the flow chart of FIG. 2A. At 220, one of the plurality of automatic snow clearing levels 214, 216, 218 has been established based on the user selection and acceptance of battery usage. This commences a control loop 270 that runs until an exit condition has been reached, as will be discussed in the following. Depending upon the established one of the plurality of automatic snow clearing levels 214, 216, 218, the snow clearing system 50 is operated in steps 224, 226 and 228. In the exemplary embodiment, operation 224 is a low power (and feature) use of the snow clearing system 50 whereas operations 226 and 228 are, respectively, medium and high power uses of the snow clearing system 50. In one example, the snow clearing system 50 operates at least one of the front and rear windshield wipers in the low power operation 224, additionally operates the OSRVM heater 56 in the medium power operation 226 and yet further additionally operates the window heater 58 (e.g. at least one of a front and rear windshield heater) in the high power operation 228. The wipers may be run a set count of times (e.g. 1 or 2 cycles) or for a set period of time (e.g. 5 minutes) in the various operations 224, 226, 228. The OSRVM heather 56 and the window heater 58 may be operated for a set amount of "on" time, where the set amount of time may be the same or different for the respective heaters 56, 58 in the medium and high power operations 226, 228. The set period of time may be 5 minutes by way of example.

At 230, a first exit condition check is performed by which a check as to whether the door is open is performed. To do so, the door position sensor 84 provides an indication of the open/closed state 86. If the door is open, then the control loop 270 exits at 248 so that no further charge of the battery 64 is used by the snow clearing system 50 without user selection of each feature from the dash panel inside the vehicle 60. In some embodiments, the first exit condition is alternatively carried out by determining whether the user is at the vehicle 60 by determining a proximity of the user device 68 to the vehicle 60, biometric recognition of the user through the perception system 100, by detecting a key fob, and the like.

If the door is not opened, the control loop 270 continues. At 232, an SOC check is performed as a second exit condition check by determining whether the charge of the battery is greater than a user selected acceptable power/charge usage. The user selected acceptable power/charge usage is selected by the user as part of selecting one of the plurality of automatic snow clearing levels 214, 216, 218. For example, the low snow clearing level 214 is associated with 1% charge usage, the medium snow clearing level 216 is associated with 3% charge usage and the high snow clearing level 218 is associated with 5% charge usage. In other embodiments, the user may be asked to separately select the amount of charge reduction (or range reduction or increase in plug-in time) that is acceptable and this value is used as the reference for the comparison in step 232. The SOC check of step 232 relies on the processor 22 keeping an accumulative track of the amount of charge used during running of the control loop 270. It may be that the low, medium and high operations 224, 226, 228 are associated with a known (e.g. pre-tested) amount of power usage that is stored in the memory 20. A count of a number of iterations of the control loop 270 in combination with the known power usage per iteration according to the one of the operations 224, 226, 228 being performed provides a total amount of charge used by the control loop 270. In another embodiment, an electrical sensor associated with the battery (e.g. the SOC sensor 76) can be used to determine the charge of the battery 64 used during iterating through the control loop 270. When the charge used (or its equivalent in range reduction or increase in plug-in time) is greater than the user selected acceptable power usage, the control loop proceeds. If not, the control loop 270 exits at 248.

At 234, a check is performed as to whether the windshield has been cleared as a result of automatic snow clearing options 224, 226, 228. The check at 234 may be performed by determining whether the perception system 100 detects an obstruction (or otherwise detects snow accumulation still being present) with respect to the window 62 being cleared. For example, a front camera module of the perception system 100 may provide images representative of an obstruction to the front windshield. The perception system 100 may determine such an obstruction based on how dark the images are or based on absence of identifiable features in the images. Additionally or alternatively, the check at 234 may be performed based on whether the precipitation sensor 12 detects snow according to the sensed precipitation 88. In other embodiments, a strain sensor could be associated with the window 62 to detect weight of accumulated snow bearing on the window 62.

If the windshield has not been cleared according to step 234, a diagnostic check is performed at 250. The diagnostic check may interrogate a diagnostic system of the vehicle system 10 to request diagnostic information concerning the various features of the snow clearing system 50 such as the wiper 28, the wiper motor 26, the window heater 58 and the OSRVM heater 56 and concerning the perception system 100 in so far as features (e.g. hardware) of the perception system 100 are being used to trigger activation of the snow clearing system 50. At 252, a count of the number of consecutive iterations of the control loop 270 when the windshield is determined not to be cleared at 234 is maintained. At 254, a third exit condition is assessed by asking if the count is greater than a calibratable threshold. If the count is greater than the threshold, then the snow clearing system 50 is determined not to be effective and the control loop 270 exits at 248 as the snow clearing system 50 seems not to be effective. If the count is less than the calibration threshold, the control loop 270 begins again starting at step 220.

At 236, a delay is introduced into the control loop 270. The delay corresponds to an adaptive detection interval that may increase or decrease an amount of delay introduced in dependence on whether there is snowfall and/or on effectiveness of the snow clearing system 50, which will be further described with respect to step 240. The detection interval stipulates an adaptive amount of time between each operation of the of the snow clearing system at operations 224, 226, 228, where the snow clearing system 50 is powered by the battery 64 during operations 224, 226, 228 and then there is a wait time according to the detection interval when the snow clearing system 50 is not powered by the battery 64 and the operations 224, 226, 228 are not performed. The control loop 270 thus introduces a varying on/off duty cycle to powering of the snow clearing system 50 with the amount of off time changing based on snowfall detection and effectiveness of snow clearing.

At 238, a SOC of the battery 64 is checked based on the SOC 96 signal provided by the SOC sensor 76 to ensure that the SOC of the battery 64 is greater than a minimum threshold such that the snow clearing system 50 is not used when the battery is very low in charge. The minimum threshold may be a predetermined value taken from memory 20. If the SOC is less than the minimum battery threshold, the control loop 270 exits at 248. If there is sufficient charge in the battery 64 remaining, the control loop 270 proceeds to step 240.

At 240, a determination is made as to whether snowfall is persisting to accumulate on the window 62. The determination can be made based on one one or more of the following criteria. A first criterium is whether the outside air temperature is less than 0° C. according to the ambient temperature sensor 18. A second criterium is whether the precipitation sensor 12 detects snow. A third criterium is whether the perception system 100 (e.g. a front camera module) detects an obstruction. The first, second and third criteria may be accumulative such that all three must be satisfied for a positive determination that snowfall continues to accumulate on the vehicle 60. Additional or alternative criteria include the perception system 100 detecting snowfall based on an unobstructed view of the outside environment allowing a measure of rate of snowfall to be estimated. A snowfall accumulated weight sensor may also be included in association with a window 62, which may be a strain sensor as described above. If snowfall continues to accumulate according to step 240, the detection interval is decreased in step 222. If snowfall is not found to have accumulated in step 240, the detection interval is increased in step 244. In this way, a frequency of operation of the control loop 270 is increased at each determination of persistent snowfall accumulation such that the snow clearing system 50 is operated more regularly. Conversely, the frequency of operation of the control loop 270 is reduced when snowfall is found not to be accumulating. A steady state may be reached by adapting the detection interval (or frequency of operation of the control loop 270) such that the snow clearing system 50 is powered only to the extent needed to maintain a clear window 62 (or windows), thereby increasing power efficiency and maximizing the time until the method 200 is exited because the user accepted battery usage is surpassed (per step 232).

Step 246 provides an exit condition by which the detection interval is only increased up to a set maximum (which may be stored in memory 20) and which is calibratable. This exit condition determines that the snow clearing system 50 has been sufficiently effective that it is not required any further. If the detection interval is not greater than the maximum threshold, the detection interval is waited at step 242 and the method 200 proceeds through 238 and 240, else the control loop 270 exits. Steps 238, 240, 244, 246, 242 provide a iterative loop within the control loop 270 that continually increase the detection interval and wait that detection interval until snowfall accumulation is detected at 240 or the detection interval goes beyond the maximum threshold. This avoids the snow clearing system 50 being powered again until snowfall accumulation requires it, thereby efficiently using the charge of the battery 64.

It should thus be appreciated that automatic snow removal systems and methods are provided. The systems and methods utilize an algorithm for electric vehicles that receive inputs from various sensors (Front Camera Module (FCM), Rain/Precipitation sensor Sensor, and Outside Air Temperature) and connectivity (GPS and weather report) while a vehicle is OFF to determine if there is snowfall and automatically clear snow off the vehicle (windshield wipers, Out Side Rear View Mirror (OSRVM), Rear Defrost) continuously so that snow does not build up. The algorithm detects and continually clear off snow from the front/Rear windshield and Outside Rearview Mirror periodically such that it does not build up to a large amount.

The systems and methods described herein provide an approach to determining when snow clearance should occur that involves the user in-the-loop and includes an energy estimation approach to communicate the State Of Charge (SOC)/Range reduction/charge time increase to the user. There is disclosed an automatic clearing algorithm method for consistently monitoring battery SOC to determine whether to continue clearing. Further, an automatic clearing algorithm method is provided for determining whether to continue wiper clear or stop, which is based on door opening position. The automatic clearing algorithm method described herein determines front windshield wiper frequency based on an adapted interval of time. The interval of time adaptation is determined based on a rate at which snow is accumulating on the vehicle. The automatic cleaning algorithm detects snow based on fusion of Outside Temperature Sensor, Rain Sensor and weather based on GPS location of vehicle. The systems and methods communicate energy consumption/time to charge increase/range reduction provided through cloud to a user's phone for acceptance of activation of snow clearing features. The user may be provided with different levels of clearing that are each associated with a different charge consumption.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an electric vehicle, the method comprising:
    detecting, based on data from a sensor system of the electric vehicle, snow that may accumulate on a window of the electric vehicle;
    when the snow is detected, providing a notification, via a communications system of the electric vehicle, to a remote user device, wherein the notification requests user acceptance of use of charge of a battery of the electric vehicle to operate a snow clearing system of the electric vehicle;
    receiving, by the communications system, a response to the notification from the remote user device;
    when the response indicates acceptance of the use of charge of the battery;
    identifying a selected automatic snow clearing level of a plurality of automatic snow clearing levels, wherein each automatic snow clearing level of the plurality of automatic snow clearing levels consumes a different amount of power from the battery;
    activating the snow clearing system to operate according to the selected automatic snow clearing level to consume a respective amount of power from the battery corresponding to the selected automatic snow clearing level; and
    stopping operation of the snow clearing system according to the selected automatic snow clearing level in response to detecting an exit condition so that no further charge of the battery is used by the snow clearing system.

2. The method of claim 1, wherein detecting, based on the data from the sensor system, the snow that may accumulate on the window comprises detecting based on a fusion of data from at least two of:
    a weather report received in response to sending a location of the electric vehicle by the communications system, the weather report providing precipitation data for the location of the electric vehicle;
    data from a precipitation sensor of the electric vehicle;
    perception data from a perception system of the electric vehicle; and
    outside temperature from a temperature sensor of the electric vehicle.

3. The method of claim 1, wherein the snow clearing system comprises at least one of:
    an outside rear view mirror heater;
    a window heater; and
    a wiper.

4. The method of claim 1, wherein the notification includes the plurality of automatic snow clearing levels comprising a plurality of types of operation of the snow clearing system that each consume the different amount of power and an indication of a limit amount of battery charge consumption for each of the plurality of types, wherein the response includes a selection of one of the plurality of types and the method comprises operating the snow clearing system according to the selected one of the plurality of types.

5. The method of claim 4, wherein stopping operation of the snow clearing system according to the selected automatic snow clearing level comprises operating the snow clearing system according to the selected automatic snow clearing level until the limit amount of battery charge consumption associated with the selected automatic snow clearing level has been reached.

6. The method of claim 4, the method comprising detecting, by the sensor system, a snow clearance state as a result of a first operation of the snow clearing system; and adapting operation of subsequent operations of the snow clearing system to change an amount of power consumed depending on the snow clearance state such that a power consumption of the snow clearing system increases as the snow accumulates on the window of the electric vehicle at a faster rate.

7. The method of claim 6, wherein detecting the snow clearance state includes detecting an obstruction of the window by a perception system of the sensor system.

8. The method of claim 6, wherein operating the snow clearing system and detecting the snow clearance state is performed in a loop, wherein adapting operation of the subsequent operations of the snow clearing system comprises adjusting a time between successive iterations of the loop.

9. The method of claim 1, wherein stopping operation of the snow clearing system according to the selected automatic snow clearing level comprises detecting opening of a door of the electric vehicle using a door sensor and ceasing operation of the snow clearing system in response to detecting opening of the door.

10. A system associated with an electric vehicle, the system comprising:
    a sensor system;
    a communications system; and
    a snow clearing system;
    at least one processor in operable communication with the sensor system, the communications system and the snow clearing system, wherein the at least one processor is configured to execute program instructions, wherein the program instructions are configured to cause the at least one processor to:
        detect, based on data from the sensor system, snow that may accumulate on a window of the electric vehicle;
        when the snow is detected, provide a notification, via the communications system, to a remote user device, wherein the notification requests user acceptance of use of charge of a battery of the electric vehicle to operate the snow clearing system of the electric vehicle;
        receive, by the communications system, a response to the notification from the remote user device; and
        when the response indicates acceptance of the use of charge of the battery:
            identify a selected automatic snow clearing level of a plurality of automatic snow clearing levels, wherein each automatic snow clearing level of the plurality of automatic snow clearing levels consumes a different amount of power from the battery;
            activate the snow clearing system, to operate according to the selected automatic snow clearing level to consume a respective amount of power from the battery corresponding to the selected automatic snow clearing level; and
            stop operation of the snow clearing system according to the selected automatic snow clearing level in response to detecting an exit condition so that no further charge of the battery is used by the snow clearing system.

11. The method of claim 1, wherein:
    the notification includes an indication of a state of charge of the battery;
    the response comprises a user selected limit of usage of the charge of the battery; and
    the exit condition comprises reaching the user selected limit of usage of the charge of the battery.

12. The method of claim 1, wherein stopping operation of the snow clearing system comprises stopping operation of the snow clearing system according to the selected automatic snow clearing level in response to detecting a state of charge of the battery is less than a minimum battery threshold.

13. The method of claim 1, further comprising reducing or increasing intensity of operation of the snow clearing system after activating the snow clearing system to operate according to the selected automatic snow clearing level depending on a rate of snow accumulation on a window or a mirror of the electric vehicle.

14. The method of claim 1, wherein each automatic snow clearing level of the plurality of automatic snow clearing levels is associated with a different number of features of the snow clearing system to be operated.

15. The method of claim 1, wherein the notification includes the plurality of automatic snow clearing levels and receiving the response comprises receiving a user selection of the selected automatic snow clearing level of the plurality of automatic snow clearing levels.

16. An electric vehicle, comprising:
    a sensor system;
    a communications system;
    a snow clearing system; and
    at least one processor in operable communication with the sensor system, the communications system and the snow clearing system, wherein the at least one processor is configured to execute program instructions, wherein the program instructions are configured to cause the at least one processor to:
        detect, based on data from the sensor system, snow that may accumulate on a window of the electric vehicle;
        when the snow is detected, provide a notification, via the communications system, to a remote user device, wherein the notification requests user acceptance of use of charge of a battery of the electric vehicle to operate the snow clearing system of the electric vehicle;
        receive, by the communications system, a response to the notification from the remote user device; and
        when the response indicates acceptance of the use of charge of the battery;
            identify a selected automatic snow clearing level of a plurality of automatic snow clearing levels, wherein each automatic snow clearing level of the plurality of automatic snow clearing levels consumes a different amount of power from the battery;
            activate the snow clearing system, to operate according to the selected automatic snow clearing level to consume a respective amount of power from the battery corresponding to the selected automatic snow clearing level; and
            stop operation of the snow clearing system according to the selected automatic snow clearing level in response to detecting an exit condition so that no further charge of the battery is used by the snow clearing system.

17. The electric vehicle of claim 16, wherein the program instructions are configured to cause the at least one processor to detect, by the sensor system, a snow clearance state as a result of a first operation of the snow clearing system; and adapt operation of subsequent operations of the snow clearing system to change an amount of power consumed depending on the snow clearance state such that a power consumption of the snow clearing system increases as the snow accumulates on the window of the electric vehicle at a faster rate.

18. The system of claim 10, wherein the notification includes the plurality of automatic snow clearing levels comprising a plurality of types of operation of the snow clearing system that each consume the different amount of power and an indication of a limit amount of battery charge consumption for each of the plurality of types, wherein the response includes a selection of one of the plurality of types and the program instructions are configured to cause the at least one processor to operate the snow clearing system according to the selected one of the plurality of types.

19. The system of claim 18, wherein the program instructions are configured to cause the at least one processor to operate the snow clearing system until the limit amount of battery charge consumption has been reached.

20. The system of claim 18, wherein the program instructions are configured to cause the at least one processor to detect, by the sensor system, a snow clearance state as a result of a first operation of the snow clearing system; and adapt operation of subsequent operations of the snow clearing system to change an amount of power consumed depending on the snow clearance state such that a power consumption of the snow clearing system increases as the snow accumulates on the window of the electric vehicle at a faster rate.

* * * * *